United States Patent [19]

Roger

[11] 4,207,940
[45] Jun. 17, 1980

[54] PNEUMATIC TIRE BEAD SEAT
[75] Inventor: Jack Roger, Romagnat, France
[73] Assignee: Compagnie Generale des Etablissements Michelin, Clermont-Ferrand, France
[21] Appl. No.: 883,322
[22] Filed: Mar. 3, 1978
[30] Foreign Application Priority Data Jul. 3, 1977 [FR] France ................. 77 06890

[51] Int. Cl.² .............................................. B60C 15/00
[52] U.S. Cl. .................................. 152/362 R; 152/405
[58] Field of Search ............. 152/362 R, 379.1, 381.1, 152/381.2, DIG. 9, DIG. 10, 396, 402, 405

[56] References Cited

U.S. PATENT DOCUMENTS

| 1,862,313 | 6/1932 | La Brie | 152/381.1 X |
| 3,405,755 | 10/1968 | Verdier | 152/381.1 |
| 3,910,336 | 10/1975 | Boileau | 152/362 R |
| 3,949,800 | 4/1976 | Lejeune | 152/362 R |
| 4,029,139 | 6/1977 | Abbott | 152/362 R X |

FOREIGN PATENT DOCUMENTS

| 846212 | 6/1952 | Fed. Rep. of Germany | 152/402 |
| 2425068 | 12/1975 | Fed. Rep. of Germany | |
| 2425743 | 12/1975 | Fed. Rep. of Germany | 152/362 R |
| 600200 | 2/1926 | France | 152/362 R |
| 633612 | of 1950 | United Kingdom | 152/396 |

Primary Examiner—John P. Silverstrim
Assistant Examiner—D. W. Underwood
Attorney, Agent, or Firm—Brumbaugh, Graves, Donohue & Raymond

[57] ABSTRACT

The assembly of a large size pneumatic tire for a heavy off the road vehicle and an annular bead seat for a bead of the tire is characterized by the fact that said annular bead seat has a lateral face terminating in a flange and an inner face with a heel portion adjacent said lateral face and a toe portion meeting at a vertex and forming in radial cross section the shape of a very open V open toward said bead, and said bead has a reinforcing bead wire so arranged that the median plane of the bead wire intersects the toe portion of the inner face at a distance from the vertex at least equal to one-tenth of the diameter of the cross-section of the bead wire, the outer surface of the bead being thus in permanent contact with the lateral face and the inner face of the annular bead seat and the assembly being slidably mountable on a wheel of the vehicle.

4 Claims, 3 Drawing Figures

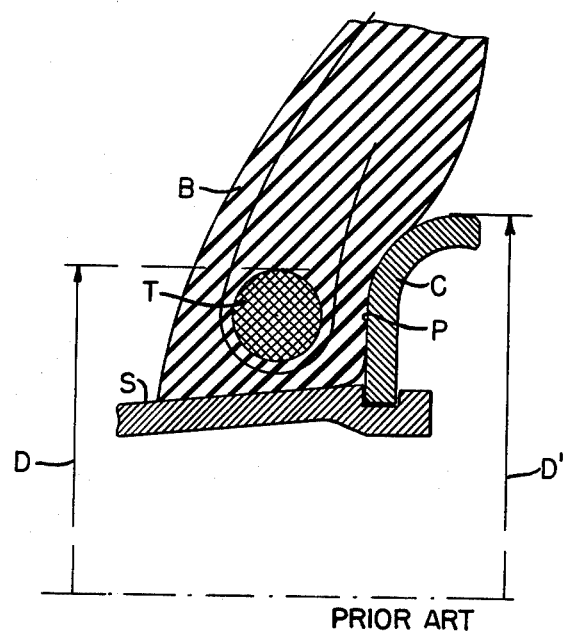
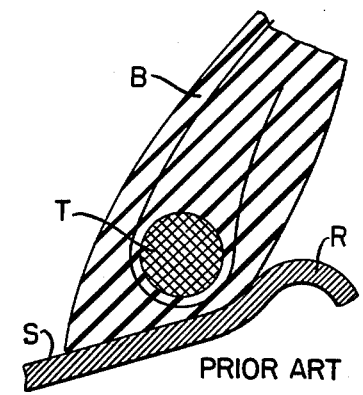
PRIOR ART
FIG. 1
PRIOR ART
FIG. 2
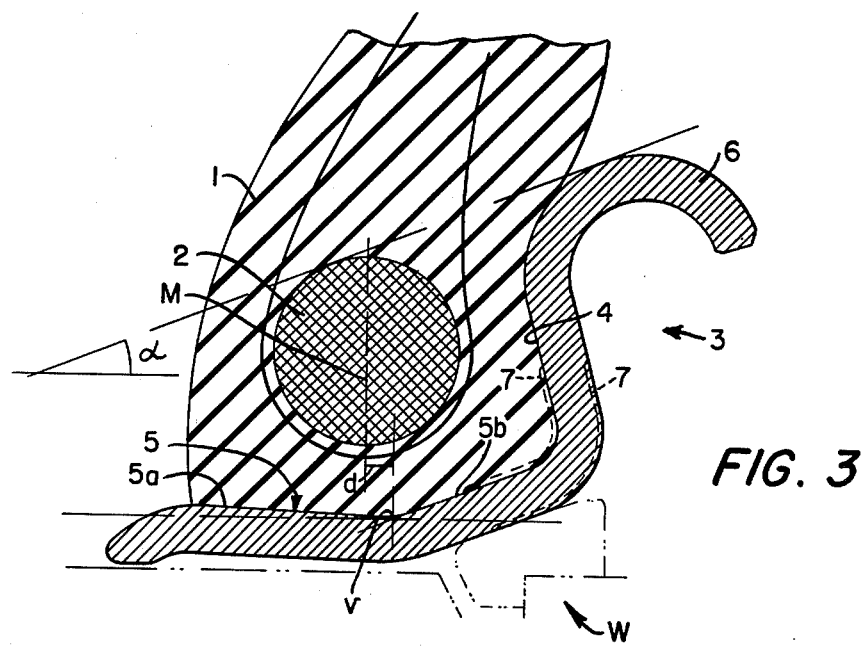
FIG. 3

PNEUMATIC TIRE BEAD SEAT

This invention relates to improvements in large size pneumatic tires employed on heavy vehicles and on equipment moving off the road for construction work. More particularly, it relates to the portions of these tires which are in contact with the wheel, that is to say their beads.

These tires are subjected to considerable stresses due to the loads carried and the torques exerted by the wheels on the ground, which raises particular problems at the level of the beads. At present, primarily two arrangements are employed, which are shown in the accompanying FIGS. 1 and 2.

In the first type (FIG. 1), the seat S of the bead B is generally inclined by about 5° towards the inside of the wheel; the rim flange is formed by a metal ring C which may be removable and contains a flat portion P perpendicular to the axis of the wheel.

It can be seen that the outside diameter D of the bead wire T is definitely smaller than the diameter D' of the flange of the lateral ring C. This arrangement requires the use of a great deal of rubber in order to produce the bead, and it makes the profile of the carcass differ substantially from its equilibrium curve, resulting in additional stresses.

In the second known type (FIG. 2), the seat S of the bead B is inclined about 15° towards the inside of the wheel; the rim flange R is very low as compared with the bead wire T.

It may be noted here that the outside diameter of the bead wire T is definitely greater than that of the flange R. The bead thus runs the danger of swinging over the flange when it is subjected to substantial transverse stresses; in order to have a proper resting surface of the bead B it is necessary to rigidify it considerably.

In both cases, the beads are overdimensioned and therefore large and heavy.

The object of the present invention is specifically to provide improvements in pneumatic tires which will make it possible greatly to decrease the weight of the beads while causing them to work under more effective and reliable conditions.

In accordance with the present invention, the assembly of a large size pneumatic tire for a heavy off the road vehicle and an annular bead seat for a bead of the tire is characterized by the fact that said annular bead seat has a lateral face terminating in a flange and an inner face with a heel portion adjacent said lateral face and a toe portion meeting at a vertex and forming in radial cross section the shape of a very open V open toward said bead, and said bead has a reinforcing bead wire so arranged that the median plane of the bead wire intersects the toe portion of the inner face at a distance from the vertex at least equal to one-tenth of the diameter of the cross-section of the bead wire, the outer surface of the bead being thus in permanent contact with the lateral face and the inner face of the annular bead seat and the assembly being slidably mountable on a wheel of the vehicle.

In a preferred embodiment of the invention, a cone which is tangential externally to the bead wire and to the flange has a half-angle at its apex of less than 25°.

In another preferred embodiment of the invention, the lateral face is inclined towards the plane of symmetry of the tire.

One embodiment of the invention will be described below by way of illustration and not of limitation, with reference to FIG. 3, which is a meridian sectional view of a bead and its seat. It will be appreciated that the other bead and its seat would be shown by a mirror image of FIG. 3.

The bead 1 of a large size pneumatic tire, reinforced with a bead wire 2, rests on an annular bead seat 3. A bead wire of circular cross section has been shown, but it will be understood that this shape is not absolutely limitative. It will be assumed that this circle is circumscribed in the actual cross section of the bead wire 2. The annular bead seat 3 has a lateral face 4 terminating in a flange 6 and an inner face 5 with a toe portion 5a and a heel portion 5b meeting at a vertex v and forming in radial cross section the shape of a very open V. By way of illustration and not of limitation, the toe portion 5a of the inner face 5 may have an inclination of between 2° and 5°, for example 3°, and that of the heel portion 5b of the inner face 5 may have an inclination of between 15° and 25°, for example 20°, with respect to the axis of the tire (not shown).

The median plane M of the bead wire 2 intersects the toe portion 5a of the inner face 5 at a distance d from the vertex v; in accordance with the invention, this distance d is at least equal to one-tenth of the diameter of the cross section of the bead wire 2.

In accordance with the invention, a cone which is tangential externally to the bead wire 2 and to a flange 6 has a half-angle $\alpha$ at its apex of less than 25°; this angle may open towards the outside of the tire (as in FIG. 3) or towards the inside.

It will be noted in FIG. 3 that the lateral face 4 is inclined towards the plane of symmetry (not shown) of the tire. This inclination may be between 10° and 20°, for example 15°.

By employing the arrangements in accordance with the invention as just described, the pressures which act in the most highly compressed portion of the bead 1 tend to push it fully towards the lateral face 4, which favors a good seating of the tire.

Finally, groovings 7 are formed on a portion of the heel portion 5b of the inner face 5 and on a portion of the lateral face 4 to lock the tire in rotation with respect to the wheel rim upon sudden changes in the torque exerted by the wheel on the ground.

As further shown in FIG. 3 (and its mirror image), the assembly of the invention is slidably mountable on a wheel W (shown in phantom lines) of the vehicle. Therefore, the large size tire can be easily mounted on a wheel of the heavy off the road vehicle, because the sliding motion occurs between two low friction metallic pieces (annular bead seat and wheel) instead of between the high friction rubber of the tire bead and the bead seat of a conventional wheel rim.

The invention offers numerous advantages and in particular a saving of material and therefore of weight and cost. Moreover, the carcass is used with its equilibrium profile and, despite this, high pressures are obtained on the lateral face of the bead seat.

What is claimed is:

1. The assembly of a large size pneumatic tire for a heavy off the road vehicle and two annular bead seats, one for each bead of the tire, characterized by the fact that each annular bead seat has a lateral face terminating in a flange and an inner face with a heel portion adjacent said lateral face and a toe portion meeting at a vertex and forming in radial cross section the shape of a very open V open toward a bead, and each bead has a reinforcing bead wire so arranged that the median plane of the bead wire intersects the toe portion of the inner face at a distance from the vertex at least equal to one-tenth of the diameter of the cross-section of the bead wire, said lateral face being inclined towards the plane of symmetry of the tire, the outer surface of each bead being thus in permanent contact with the lateral face and the inner face of an annular bead seat and the assembly being slidably mountable on a wheel of the vehicle.

2. The assembly according to claim 1, characterized by the fact that a cone which is tangential externally to the bead wire and to the flange has a half-angle at its apex of less than 25°.

3. The assembly according to claim 1, characterized by the fact that the heel portion of the inner face is inclined between 15° and 25° with respect to the axis of the tire and the toe portion of the inner face is inclined between 2° and 5° with respect to the axis of the tire.

4. The assembly according to claim 1, characterized by the fact that the lateral face is inclined between 10° and 20° with respect to the plane of symmetry of the tire.

* * * * *

UNITED STATES PATENT AND TRADEMARK OFFICE
CERTIFICATE OF CORRECTION

PATENT NO. : 4,207,940
DATED : June 17, 1980
INVENTOR(S) : Jack Roger

It is certified that error appears in the above-identified patent and that said Letters Patent are hereby corrected as shown below:

First page, Item 30, "Jul. 3, 1977" should read
-- Mar. 7, 1977 --.

Signed and Sealed this

Twenty-third Day of September 1980

[SEAL]

Attest:

SIDNEY A. DIAMOND

Attesting Officer

Commissioner of Patents and Trademarks